US008928266B1

(12) United States Patent
Lin

(10) Patent No.: US 8,928,266 B1
(45) Date of Patent: Jan. 6, 2015

(54) HIGH EFFICIENCY ELECTRIC MOTOR DRIVE SYSTEM

(71) Applicant: William Chin-Woei Lin, Troy, MI (US)

(72) Inventor: William Chin-Woei Lin, Troy, MI (US)

( * ) Notice: Subject to any disclaimer, the term of this patent is extended or adjusted under 35 U.S.C. 154(b) by 0 days.

(21) Appl. No.: 14/040,686

(22) Filed: Sep. 29, 2013

(51) Int. Cl.
*H02P 7/00* (2006.01)
*H02P 21/00* (2006.01)
*H02P 1/00* (2006.01)
*H02K 7/116* (2006.01)
*H02K 16/00* (2006.01)
*H02P 7/06* (2006.01)

(52) U.S. Cl.
CPC ............... *H02K 7/116* (2013.01); *H02K 16/00* (2013.01); *H02P 7/06* (2013.01); *H02P 2007/69* (2013.01)
USPC ....... 318/432; 318/400.02; 318/434; 318/139

(58) Field of Classification Search
CPC .... H02P 21/06; H02P 21/146; H02P 2007/05
USPC .............................. 318/432, 434, 400.02, 139
See application file for complete search history.

(56) References Cited

U.S. PATENT DOCUMENTS

| 7,847,501 | B2 * | 12/2010 | Baglino et al. ........... 318/432 |
| 8,579,055 | B2 * | 11/2013 | Sasahara et al. .......... 180/6.5 |
| 2004/0090195 | A1 * | 5/2004 | Motsenbocker .......... 318/109 |
| 2011/0126354 | A1 * | 6/2011 | Hamberg et al. ........... 5/600 |
| 2011/0247886 | A1 * | 10/2011 | Sasahara et al. .......... 180/6.5 |
| 2013/0002173 | A1 * | 1/2013 | Baglino et al. ........... 318/139 |
| 2013/0096753 | A1 * | 4/2013 | Severinsky et al. ......... 701/22 |

* cited by examiner

*Primary Examiner* — Eduardo Colon Santana
*Assistant Examiner* — Gabriel Agared
(74) *Attorney, Agent, or Firm* — William C. Lin, PLC

(57) ABSTRACT

An electric drive system includes a motor output shaft rotating on a motor axis and a first electric motor. The system includes an epicyclical gear that includes a sun gear, a ring gear, a plurality of planet gears and a carrier. The sun gear, the ring gear and the carrier gear of the epicyclical gear all rotate on the motor axis, and the carrier gear is connected to the motor output shaft via a first flange. The system also includes a second electric motor interposed between the first electric motor and the epicyclical gear. The second motor shaft has a hollow center along the motor axis and the first motor shaft extends through the hollow center of the second motor shaft and is connected to the sun gear. The system also includes a second flange. The second flange connects the second motor shaft to the carrier. The first flange and the second flange are located at opposite sides of the epicyclical gear.

3 Claims, 7 Drawing Sheets

HIGH EFFICIENCY ELECTRIC MOTOR DRIVE SYSTEM

FIELD

The present invention relates to electric propulsion system, and more particularly to the electric propulsion system with high efficiency for propulsion of electric vehicles.

BACKGROUND

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

Electric vehicle (EV) relies on an electric motor, or multiple electric motors, for its propulsion. One of the key issues with respect to electric vehicle operation is achieving high system efficiency. Optimization of the EV system efficiency under all operating conditions has been among the top, if not the very top, endeavor of all engineering efforts devoted to the development of electric vehicle technologies. Inevitably, improvement of the electric motor efficiency is also a focus point of EV technology development.

Electric motors may be designed in various forms; however, each of the motors possesses operating points with higher efficiency and those with lower efficiency as well. When an electric motor is used for operation of various machine tools and equipment with fairly constant speed and torque, the system can be designed so the motor is operated at its highest efficiency for most of the time. However, when electric motors are used for electric vehicle propulsion, the situation is quite different from machine tools.

An electric vehicle needs to operate in a wide range of torque and speed to meet all performance requirements. For example, an electric vehicle needs to cruise in constant speed on leveled ground of city roads, in which the speed may range from low speed to high speed. The electric vehicle may also need to climb up slopes of various ramps and bridges, or even roads over to a hill. The electric vehicle may need to provide certain level of acceleration so it would not interrupt the normal traffic flow. The electric vehicle may even need to accommodate a fairly wide range of load variation, for example, in delivering vehicles or in buses. Therefore, it can be appreciated that electric motor operation in electric vehicles is quite different from that in machine tools.

While the electric motor operation needs to cover a wide range of torque and speed in electric vehicle propulsion and there is no way to fix the operation on the motor operating point with the highest motor efficiency, the motor design for electric vehicles faces a dilemma of providing the electric vehicle with desired high performance or providing the electric vehicle with an overall higher efficiency. When the electric motor needs to provide high performance for the electric vehicle, higher power and higher toque are needed to provide vehicle operation of high acceleration, high capability of slope climbing with desired, that is, higher, speeds while carrying higher loads. In this case, the motor may be operated in the high-efficiency point with these high-demand operations. However, when the electric motor is driven on leveled ground of city roads for most of the time, the efficiency becomes relatively low.

On the other hand, if the electric motor operation is to provide a higher overall efficiency over the electric vehicle operation, the motor needs to be designed with limitation where lower power and lower torque are provided. In this case, during the most operation of the electric vehicle over the leveled ground of city roads, the efficiency becomes higher. Yet, in such system, the electric vehicle can only have a lower level of acceleration, can only climb up slopes with a relatively low speed, and can only has a lower capability of starting over an inclined road of significant slope.

SUMMARY

Advantageously, an electric motor drive for electric vehicle operation is devised according to the principle of this invention where the electric vehicle may operate with higher efficiency in a lower-power and lower-torque region such as in city-road operation. On the other hand, the electric vehicle may also operate with high efficiency in a higher-power and higher-torque region such as in hard acceleration, hill climbing with decent speeds while carrying heavier loads.

In one feature, an electric propulsion system for a vehicle is described. The system includes a motor output shaft rotating on a motor axis and a first electric motor which includes a first motor shaft rotating on the motor axis. The first electric motor includes a first rotor which is axially connected with the first motor shaft. The first electric motor also includes a first armature which is located radially outward of the first rotor, and the first armature receives a first electric current and interacts electromagnetically with the first rotor to generate a first motor torque. The system includes an epicyclical gear with a sun gear, a ring gear, a plurality of planet gears interposed between the sun gear and the ring gear, a carrier gear of the planet gears. The sun gear, the ring gear and the carrier gear of the epicyclical gear all rotate on the motor axis, and the carrier gear is connected to the motor output shaft via a first flange. The system also includes a second electric motor interposed between the first electric motor and the epicyclical gear. The second electric motor includes a second motor shaft rotating on the motor axis, a second rotor axially connected with the second motor shaft, and a second armature which is located radially outward of the second rotor. The second armature receives a second electric current and interacts electromagnetically with the second rotor to generate a second motor torque. The second motor shaft has a hollow center along the motor axis and the first motor shaft extends through the hollow center of the second motor shaft and is connected to the sun gear. The system also includes a second flange. The second flange connects the second motor shaft to the carrier gear. The first flange and the second flange are located at opposite sides of the epicyclical gear.

In other features, a method of operating the electric propulsion system is described. The method includes steps of computing a system power demand based on a system torque signal and a system speed signal. The method also compares the system torque signal and the second torque rating of the second electric motor, generates the second electric current for the second electric motor based on the system torque signal and generating a zero first electric current for the first electric motor when the system torque signal is less than or equal to the second torque rating and the system power demand is less than or equal to the second power rating; and generates the first electric current for the first electric motor and generating the second electric current for the second electric motor when the system torque signal is greater than the second torque rating or the system power demand is greater than the second power rating. Under this situation, the method determines a first initial torque command for the first electric motor based on the system torque signal and the second torque rating, determines a second initial torque command for the second electric motor based on the second torque rating, sets a first initial speed command for the first electric motor equal to the system speed signal, sets a second initial speed command for the second electric motor equal to the system speed signal, determines a first update torque command for the first electric motor, wherein the first update torque command is different than the first initial torque, determines a second update torque command for the second electric motor, wherein the second update torque command is different than the second initial torque, and wherein the sum of the first update torque command and the second torque update command equals to the system torque signal, determines a first update speed command (N1) for the first electric motor, wherein the first update speed command is different than the first initial speed command, and determines a second update speed command (N2) for the second electric motor, wherein the second update speed command is different than the second initial speed command, and wherein the first update speed command, the second update speed command and the system speed signal (N) are related with each other according to a mechanical constraint imposed by the gear ratio relationship among the sun gear, ring gear and the carrier.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
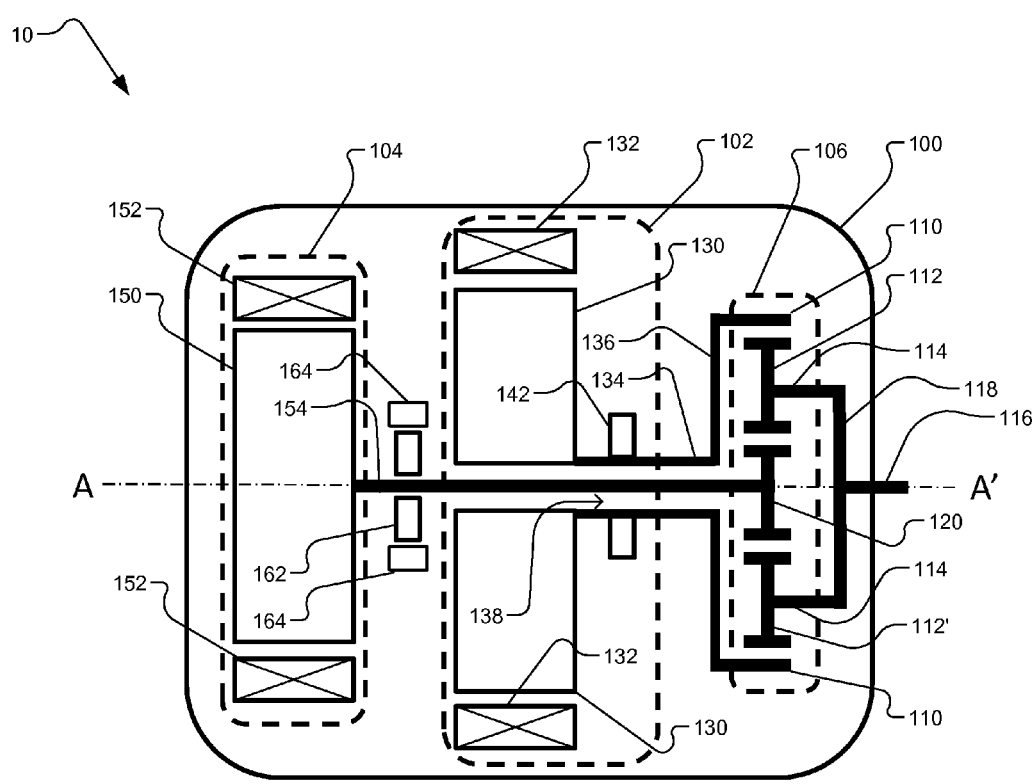
FIG. 1 is a plan view of an electric motor drive according to the principle of the present invention.

The following description is merely exemplary in nature and is in no way intended to limit the disclosure, its application, or uses. For purposes of clarity, the same reference numbers will be used in the drawings to identify similar elements. It should be understood that steps within a method may be executed in different order without altering the principles of the present disclosure.

As used herein, the term module refers to an Application Specific Integrated Circuit, an electronic circuit, a processor (shared, dedicated, or group) and memory that execute one or more software or firmware programs, a combinational logic circuit, and/or other suitable electrical or electronic components or devices that provide the described functionality.

Referring now to FIG. 1, a plan view of an electric motor drive 10 is shown. The electric motor drive 10 may include a motor set 100. The motor set 100 may include a primary motor 102, a secondary motor 104 and a primary gear set 106. The primary gear set 106 may be an epicyclical gear, or more specifically a commonly used planetary gear. The primary gear set 106 may include a ring gear 110, a plurality of planet gears 112 meshing with the ring gear 110, and a carrier 114 for the planet gears 112 connected with the planet gears 112 at respective hubs of the planet gears 112. The carrier 114 may be mechanically connected to a drive shaft 116 of the motor set 100 via an output flange 118. The drive shaft 116 may rotate on an axis AA'. The primary gear set 106 may have a sun gear 120 meshing with the plant gears 112.

The primary motor 102 may have a rotor 130. The rotor 130 may rotate on the axis AA'. The primary motor 102 may have an armature 132 that receives electric current to generate magnetic field to interact with a magnetic field generated in the rotor 130. The rotor 130 may be connected to an output shaft 134 that also rotates on the axis AA'. The output shaft 134 of the primary motor 102 may be mechanically connected to the ring gear 110 via a primary flange 136. The output shaft 134 may have a hollow center 138.

The primary motor 102 may include an internal gear 142 interposed between and connected to the rotor 130 and the output shaft 134. In one embodiment, the internal gear 142 may cause the speed of the rotor 130 to be faster than the speed of the output shaft 134. In another embodiment, the internal gear 142 may cause the speed of the rotor 130 to be slower than the speed of the output shaft 134.

The secondary motor 104 may include a rotor 150. The rotor 150 may rotate on the axis AA'. The secondary motor 104 may have an armature 152 that receives electric current to generate magnetic field to interact with a magnetic field generated in the rotor 150. The rotor 150 may be connected to an output shaft 154 that also rotates on the axis AA'. The output shaft 154 of the secondary motor 104 may be mechanically connected to the sun gear 120 through the hollow center 108 of the output shaft 134 of the primary motor 102.

The motor set 100 may include a clutch 162 interposed between the output shaft 154 of the secondary motor 104 and a stationary part 164 of the motor set 100. In one mode of operation the clutch 162 may be engaged so the output shaft 154 of the secondary motor 104 may be connected to the stationary part 164 causing the output shaft 154 to stop rotating. In another mode of operation the clutch 162 may be disengaged so the output shaft 154 of the secondary motor 104 may be free to rotate. In one embodiment, the clutch 162 may be a mechanically operated one-way clutch so it is disengaged when the output shaft 154 rotates in a certain angular direction; and the one-way clutch is engaged when the output shaft 154 is driven to the opposite angular direction. In another embodiment, the clutch 162 may be an electronically controlled clutch, of which the state of engagement and disengagement is determined by an electronic controller (not shown).

Figure 2:
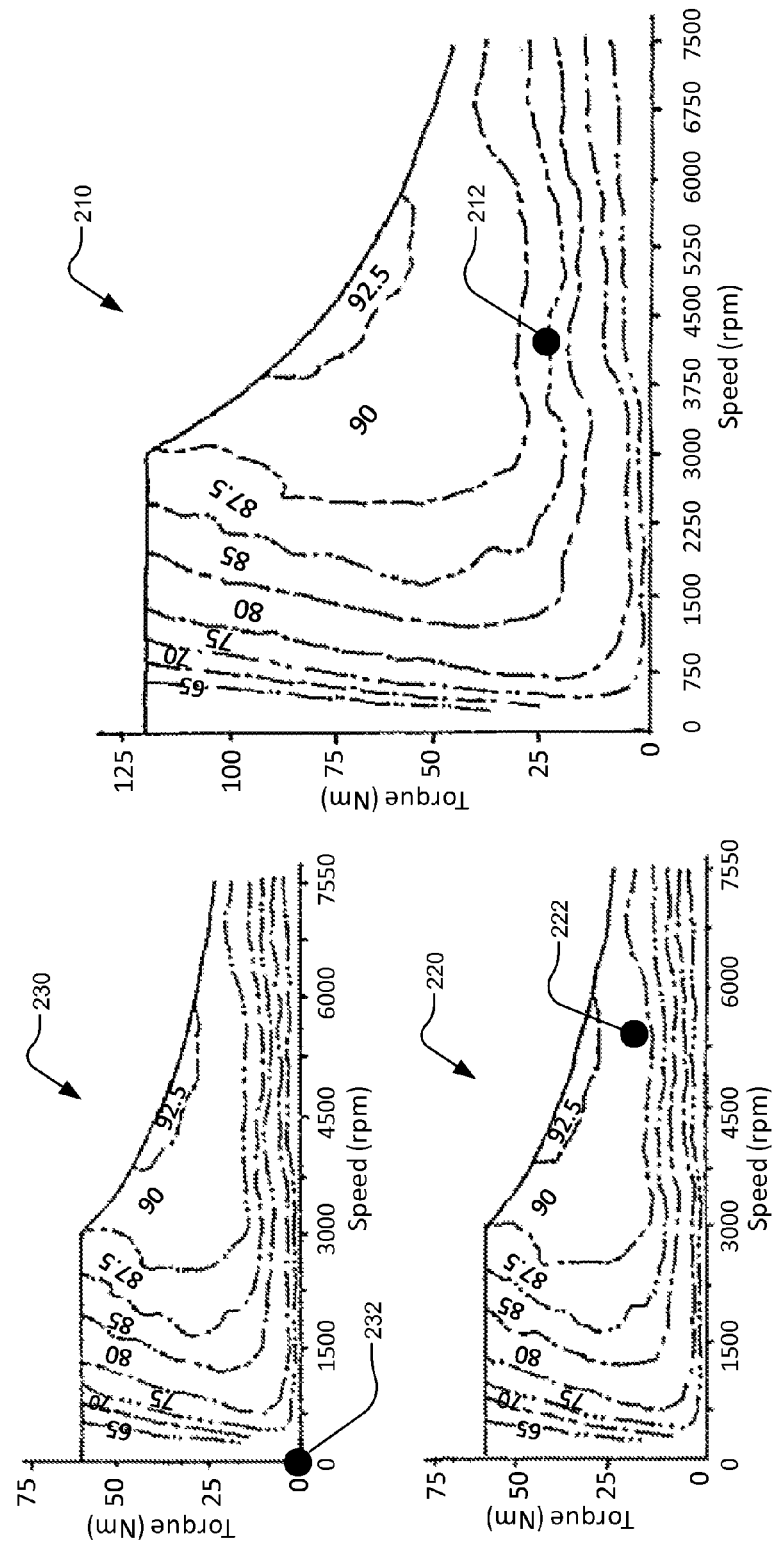
FIG. 2 is a graphical illustration of an example mode of operation of the electric motor drive according to the principle of the present invention.

Referring now also to FIG. 2, a graphical illustration of an example mode of operation of the electric motor drive 10 is shown. For illustrative purpose only, the primary gear set 106 is assumed to be a planetary gear set having a gear ratio of 4:1 between its sun gear and ring gear. Also for illustrative purpose only, a reference motor (not shown) with rated power at 20 kW and peak power at 35 kW is assumed to meet certain desired performance specifications of an electric vehicle application. A motor efficiency map 210 of the reference motor is shown. On the efficiency map 210 an example operating point 212 is shown where the reference motor delivers a torque of 25 Nm and rotates at a speed of about 4100 rpm. The motor efficiency in such operation is little over 86% as indicated in the efficiency map 210.

Instead of using the reference motor with the efficiency map 210, an example motor set 100 is used. This example motor set 100 has a primary motor 102 smaller than the reference motor, and also has a secondary motor 104 smaller than the reference motor. For illustrative purpose only, the primary motor 102 and the secondary motor 104 are both designed and constructed identically as half-scale of the reference motor. In this example, the primary motor 102 does not have an internal gear between its rotor 130 and output shaft 134. A motor efficiency map 220 describes the characteristics of the primary motor 102, and a motor efficiency map 230 describes the characteristics of the secondary motor 104. Those skilled in the art of electric machines may appreciate the difference between the efficiency maps 220, 230 and the efficiency map 210. The difference lies on the half magnitude of motor torque in the half-scaled primary and secondary motors compared with that of the reference motor, however, the distribution of the motor efficiency is the same relative to the top operating speed and maximum torque.

In this example, operating the primary motor 102 at an operating point 222 and operating the secondary motor 104 at an operating point 232, a higher efficiency in motor operation is attained as compared with the operation using the reference motor; yet the motor set 100 delivers the same power and torque at the drive shaft 116 as compared to the reference motor. Those skilled in electric machines may also appreciate an apparent ratio between the primary motor torque at operating point 222 and the reference motor torque at operating point 212; as well as the inverse of the ratio between the primary motor speed at operating point 222 and the reference motor speed at operating point 212. The ratio arises out of the assumption of the planetary gear ratio between the sun gear and the ring gear while the primary motor does not have an internal gear.

Gear speeds of a planetary gear set has its operation governed by the following relationship in Equation (1):

$$N_c = \frac{R_s}{R_s + R_r}N_s + \frac{R_r}{R_s + R_r}N_r \quad (1)$$

where N represents speed of respective gears, R represents radius of respective gears, subscripts c, s and r represents carrier, sun gear and ring gear, respectively.

Equation (1) may be written in another form as Equation (2) below:

$$N_c = C_g N_s + (1 - C_g) N_r \quad (2)$$

where $C_g$ is a constant determined by the gear radii of sun gear and ring gear.

In this example, the secondary motor 104 is operated at zero speed and delivers zero torque. While the secondary motor 104 delivers zero torque, a reaction torque is generated by the clutch 162 that makes up the difference between the torque generated by the primary motor 102 at operating point 222 and the desired torque generated by the reference motor at operating point 212. Without the clutch 162 while no torque is generated by the secondary motor 104, the output shaft 154 of the secondary motor 104 would have been driven backward. A one-way clutch can allow the secondary motor 104 to rotate forward with the same direction as the primary motor 102, and it also prevents the secondary motor 104 from rotating to the opposite angular direction against the rotation of the primary motor 102.

Figure 3:
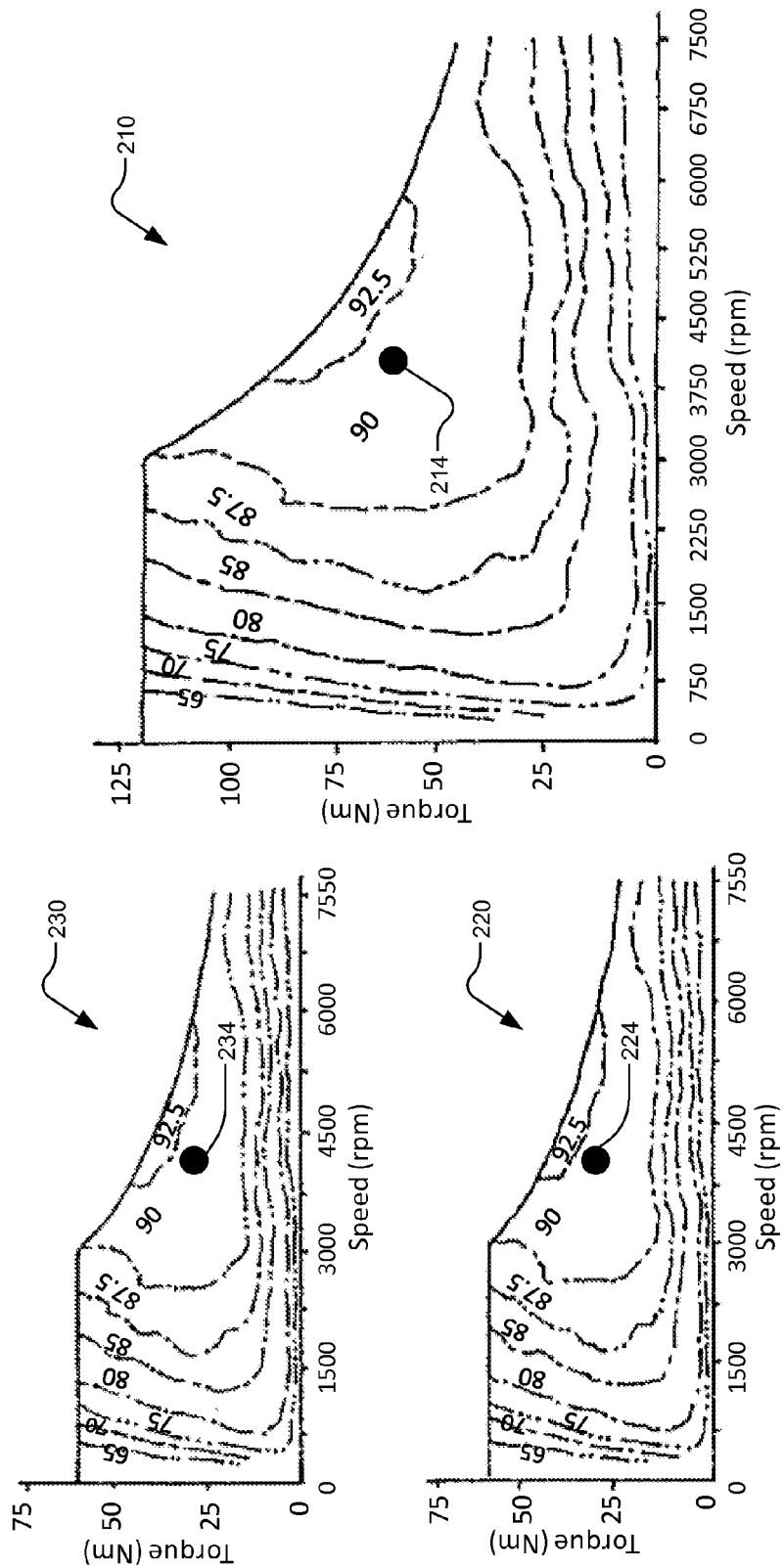
FIG. 3 is graphical illustration of another example mode of operation of the electric motor drive according to the principle of the present invention.

Referring now also to FIG. 3, a graphical illustration of another example mode of operation of the electric motor drive 10 is shown. In this example, if the reference motor is used, an operating point 214 is desired to have the motor deliver a torque of about 60 Nm and operating at a speed of 4000 rpm. This magnitude of power delivery exceeds the capacity of any of the primary motor 102 and the secondary motor 104. Therefore, both the primary motor 102 and the secondary motor 104 need to provide part of the power and torque for the desired electric vehicle operation.

For illustrative purpose only, in this example, the primary motor 102 operates at an operating point 224 that delivers half of the desired torque of 30 Nm while running at the same speed of 4000 rpm. The secondary motor 104 operates at an operating point 234 that delivers half of the desired torque of 30 Nm while running at the same speed of 4000 rpm. In combination, the motor set 100 delivers a 60 Nm at the drive shaft 116 operating at the desired speed of 4000 rpm.

In this example, if the reference motor is used, the motor efficiency is 90%. It also noticed that both the primary motor 102 and the secondary motor 104 operate with the same motor efficiency of 90%. In combination, the motor set 100 operates at the same motor efficiency as the reference motor.

Figure 4:
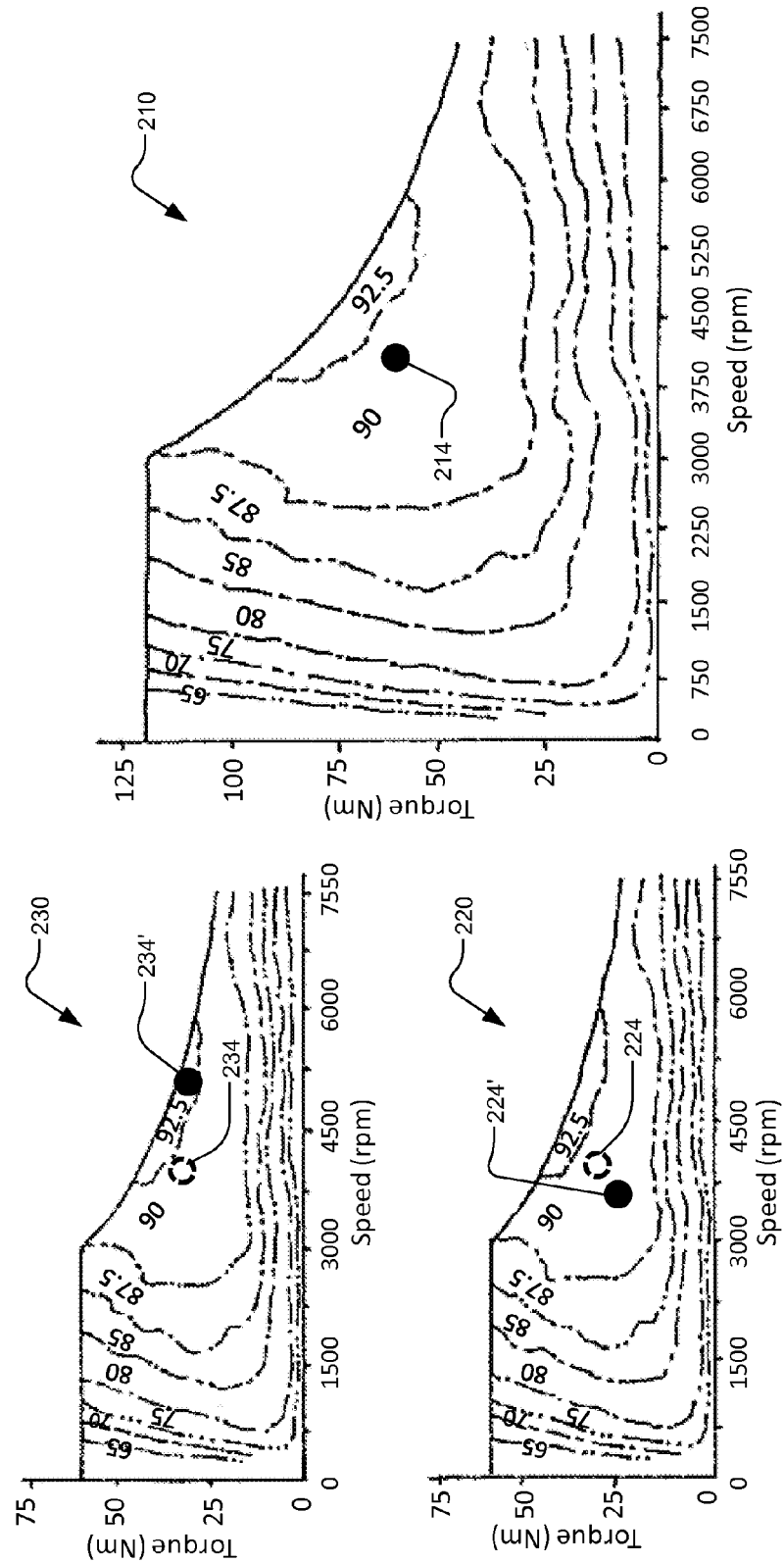
FIG. 4 is graphical illustration of yet another example mode of operation of the electric motor drive according to the principle of the present invention.

Referring now also to FIG. 4, a graphical illustration of yet an example mode of operation of the electric motor drive 10 is shown. In this example, compared with the operation illustrated in FIG. 3, the desired motor performance out of the reference motor is the same. The reference motor needs to operate at the same operating point 214. However, the primary motor 102 may operate at a different operating point 224', and the secondary motor 104 may operate at a different operating point 234'.

In this example, the primary motor 102 operating point is changed from 224 to 224' by reducing its operating torque and speed, and the secondary motor 104 operating point is changed from 234 to 234' by increasing its operating torque and speed. The adjustments of these operating points may be determined so that the sum of the motor torques of the primary motor 102 and the secondary motor 104 results in the same as the desired reference motor torque. Further, the adjustment on the speeds of the primary motor 102 and the secondary motor 104 may be governed by Equation (2) where the carrier speed corresponds to the reference motor speed, the ring gear speed corresponds to the primary motor speed and the sun gear speed corresponds to the secondary motor speed.

Figure 5:
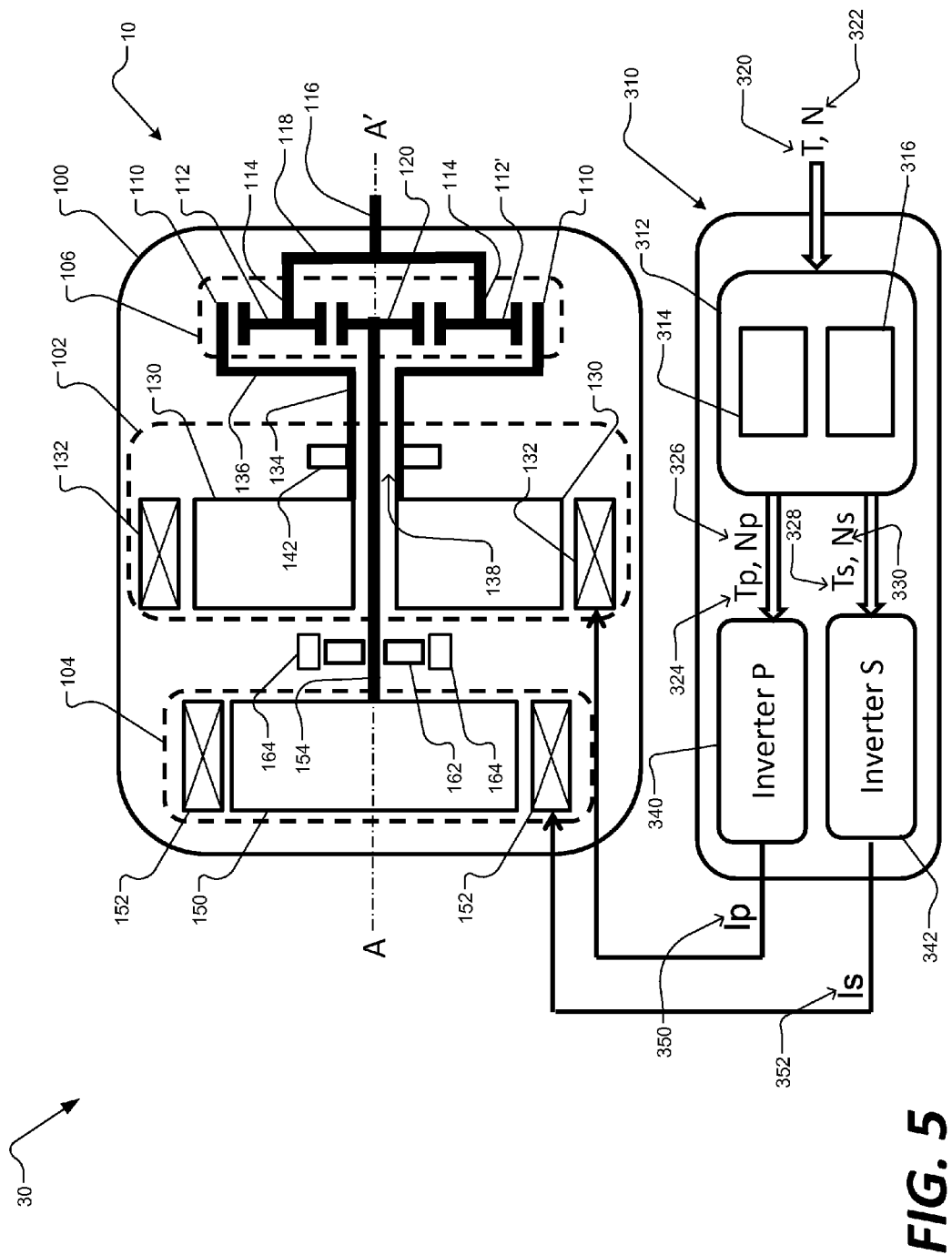
FIG. 5 is a plan view of an electric propulsion system according to the principle of the present invention.

Referring now to FIG. 5, a plan view of an electric propulsion system 30 is shown. The electric propulsion system 30 includes the electric motor drive 10 and a motor drive control unit 310. The motor drive control unit 310 is electrically connected with the motor set 100 of the electric motor drive 10 to provide desired electric currents to operate the primary motor 102 and the secondary motor 104.

The motor drive control unit 310 receives a system torque signal (T) 320 and a system speed signal (N) 322 from a vehicle system controller (not shown), and generates primary motor current (Ip) 350 and secondary motor current (Is) 352 for the primary motor 102 and the secondary motor 104, respectively. The primary motor current 350 may be delivered to the armature 132 of the primary motor 102, and the secondary motor current 352 may be delivered to the armature 152 of the secondary motor 104 via electrical connections between the motor drive control unit 310 and the motor set 100.

The motor drive control unit 310 may include a system optimization unit 312, a primary inverter 340 for the primary motor 102, and a secondary inverter 342 for the secondary motor 104. The system optimization unit 312 inputs the system torque signal 320 and the system speed signal 322 received by the motor control unit 310, and generates a primary motor torque command (Tp) 324, a primary motor speed command (Np) 326, a secondary motor torque command (Ts) 328, and a secondary motor speed command (Ns) 330 based on the system torque signal 320 and the system speed signal 322.

The system optimization unit 312 may include a data memory module 314 and a computation module 316. Motor efficiency data of the primary motor 102 and the secondary motor 104 may be stored in the data memory module 314. Parameters of the primary gear set 106 may also be stored in the data memory module 314. The data stored in the data memory module 314 may be retrieved and utilized by the computation module 316 for determining the primary motor torque command 324, the primary motor speed command 326, the secondary motor torque command 328 and the secondary motor speed command 330. The computation module 316 may perform system optimization processes to determine operating points for the primary motor 102 and the secondary motor 104 that result in an optimal efficiency in operation. The system optimization process may be performed based on the motor efficiency data stored in the data memory module 314.

The primary inverter 340 receives the primary motor torque command 324 and the primary motor speed command 326, and generates the primary motor current 350 based on the primary motor torque command 324 and the primary motor speed command 326 by regulating an electric current flowing out of an energy storage device (not shown) to the armature 132 of the primary motor 102. The energy storage device may be a battery pack. The secondary inverter 342 receives the secondary motor torque command 328 and the secondary motor speed command 330, and generates the secondary motor current 352 based on the secondary motor torque command 328 and the secondary motor speed command 330 by regulating another electric current flowing out of the energy storage device to the armature 152 of the secondary motor 104. The electric current generated by the inverters to the respective motor armature may be three-phase current.

Figure 6:
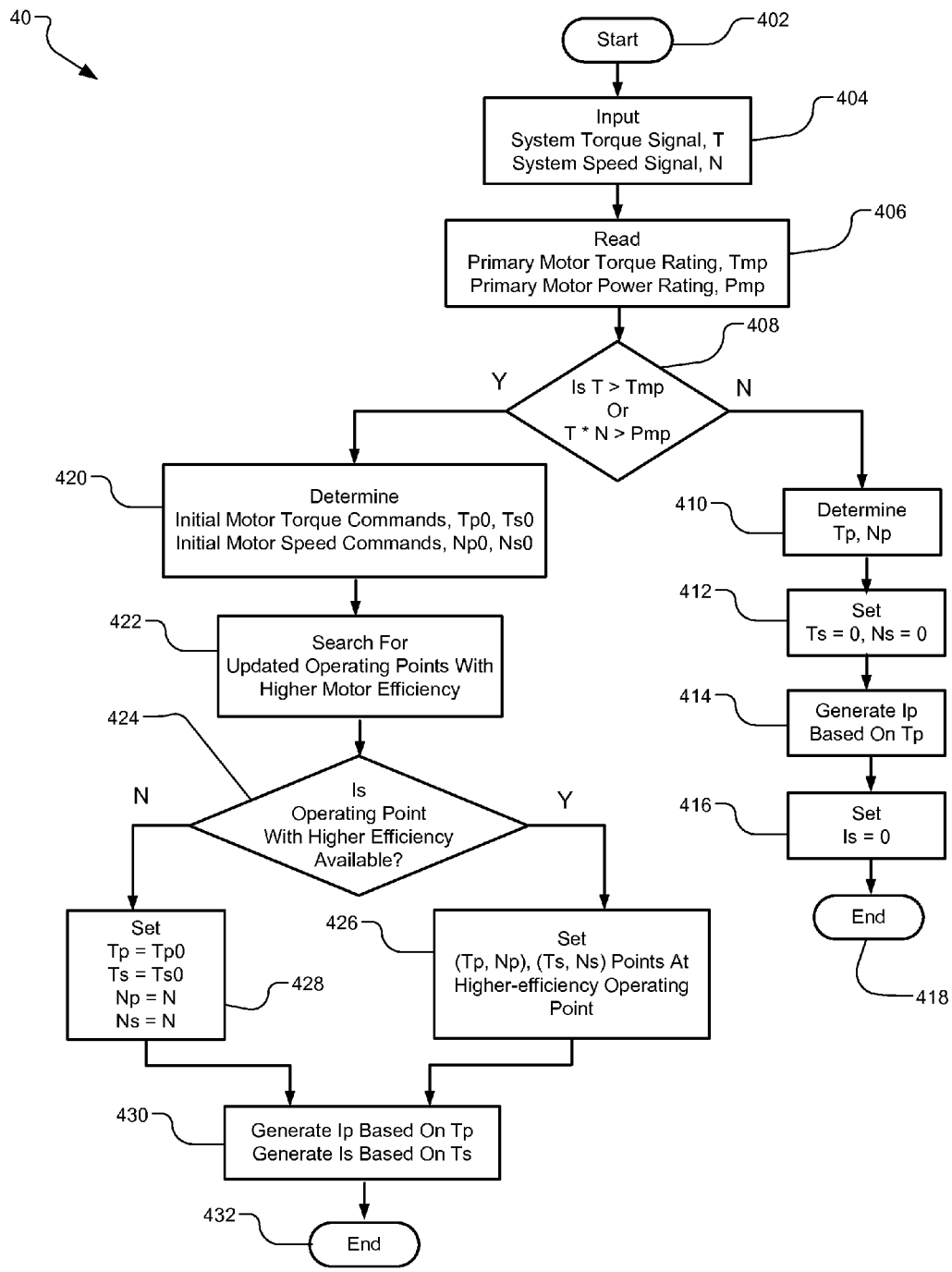
FIG. 6 is a flow diagram illustrating a method for operating the electric propulsion system according to the principle of the present invention.

Referring now also to FIG. 6, a flow diagram illustrating a method 40 for operating the electric propulsion system 30 is shown. The method 40 may be performed by the motor drive control unit 310. The system optimization unit 312 of the motor drive control unit 310 may perform the method 40 to generate the primary motor torque command 324, the primary motor speed command 326, the secondary motor torque command 328, and the secondary motor speed command 330.

At each control period determined by a vehicle system controller (not shown), the method 40 may start at step 402, and proceed to step 404 for signal input. In step 404, the system optimization unit 312 may input the system torque signal (T) 320 and the system speed signal (N) 322 from the vehicle system controller. In step 406, the computation module 316 may read data of a primary motor torque rating (Tmp) and data of a primary motor power rating (Pmp). The data of the primary motor torque rating and the primary motor power rating may be stored in the data memory module 314.

In step 408, the computation module 316 may compare the magnitude of the system torque signal with the primary torque rating. The computation module 316 may also compare a product of the magnitude of the system torque signal and the system speed signal with the primary power rating. The method may proceed to step 420 when the computation module 316 determines that the magnitude of the system torque signal is greater than the primary torque rating, or the product of the magnitude of the system torque signal and the system speed signal is greater than the primary power rating. The method may proceed to step 410 when the computation module 316 determines that the magnitude of the system torque signal is not greater than the primary torque rating, and the product of the magnitude of the system torque signal and the system speed signal is not greater than the primary power rating.

In step 410 the computation module 316 determines the primary motor torque command (Tp) and the primary motor speed command (Np) based on the system torque signal (T) and the system speed signal (N). In one embodiment, the computation module 316 may set the primary motor torque command (Tp) equal to the magnitude of the system torque signal (T), and set the primary motor speed command (Np) equal to the magnitude of the system speed signal (N). In another embodiment, the computation module 316 may set the primary motor torque command (Tp) equal to the magnitude of the system torque signal (T) multiplied by a gear ratio, and set the primary motor speed command (Np) equal to the magnitude of the system speed signal (N) multiplied by an inverse of the gear ratio.

In step 412 the computation module 316 determines the secondary motor torque command (Ts) and the secondary motor speed command (Ns). In one embodiment, the computation module 316 may set the secondary motor torque command equal to zero, and set the secondary motor speed command to zero. In yet another embodiment, the computation module 316 may set the secondary motor speed command to zero, but set the secondary motor torque command equal to the difference between the magnitude of the system torque signal and the primary motor torque command.

In step 414, the primary inverter 340 may generate the primary motor current (Ip) based on the primary motor torque command (Tp). In step 416, the secondary inverter 342 may generate the secondary motor current (Is) based on the secondary motor torque command (Ts). In one embodiment, when the secondary motor torque command (Ts) is set equal to zero, the secondary motor current (Is) is also set to zero. The process of method 40 may end at step 418.

In step 420 following step 408 when the test result in step 408 is affirmative, the system optimization unit 312 determines an initial primary torque command (Tp0), an initial secondary motor command (Ts0), an initial primary motor speed command (Np0), and an initial secondary motor speed command (Ns0) based on the system torque signal (T) and the system speed signal (N). Each of the initial primary motor torque command and the initial secondary motor torque command may be set at half of the magnitude of the system torque signal. Each of the initial primary motor speed command and the initial secondary motor speed command may be set at the magnitude of the system speed signal.

In step 422, the system optimization unit 312 may perform search for an updated operating point that results in a higher motor efficiency than any of the initial operating points defined by the initial primary motor torque command and the initial primary motor speed command, or defined by the initial secondary motor torque command and the initial secondary motor speed command. The search may be based on motor efficiency data stored in the data memory module 314. In one embodiment, the search may be performed within an area around the initial operating point not exceeding a predefined distance away from the initial operating point. In another embodiment, a sequence of predefined distances may be used for multiple searches to determine an optimal operating point among those found with higher efficiency than the initial operating points.

In step 424, the computation module 316 determines whether the search performed in step 422 is successful in finding an updated operating point with higher motor efficiency. Step 424 proceeds to step 426 when the result is positive, and step 424 proceeds to step 428 when the result is negative.

In step 426, the computation module 316 sets the motor operating points according to the updated higher efficiency operating points found in step 422. In step 428, the computation module 316 sets the motor operating points according to the initial operating points determined in step 420.

In step 430, the primary inverter 340 generates the primary motor current 350 based on the primary motor torque command 324, and the secondary inverter 342 generates the secondary motor current 352 based on the secondary motor torque command 328. After performing step 430, the process may end at step 432 for the control period.

Figure 7:
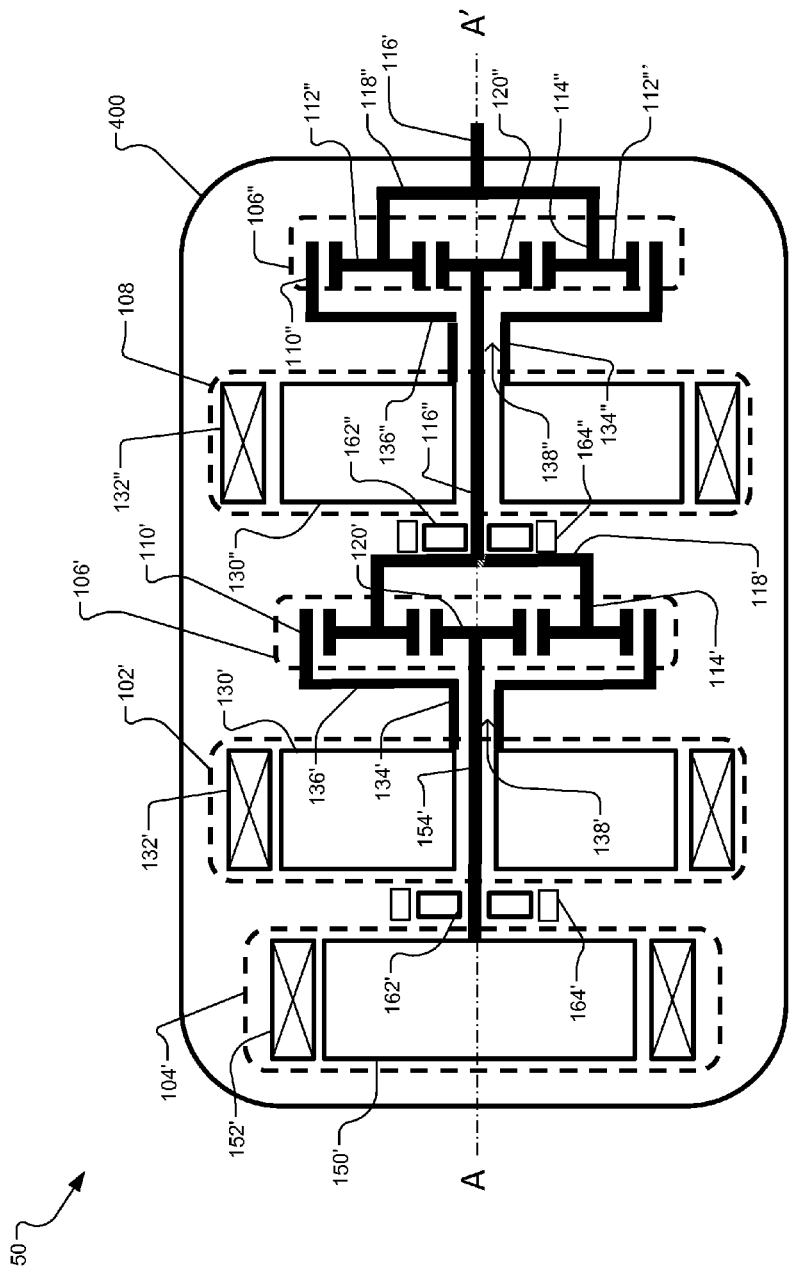
FIG. 7 is a plan view of another electric motor drive according to the principle of the present invention.

Referring now to FIG. 7, a plan view of another electric motor drive 50 is shown. The electric motor drive 50 includes a motor set 400 which includes motors and gear set similar to those contained in the motor set 100 in FIG. 1. The motor set 400 may include a primary motor 102', a secondary motor 104' and a primary gear set 106'. The motor set 400 further includes a forward-stage motor 108 and a forward-stage gear set 106". The forward-stage motor 108 may be similar to the primary motor 102' and the forward-stage gear set 106" may be similar to the primary gear set 106'. The primary gear set 106' is connected to a drive shaft 116" that rotates on an axis AA'.

The forward-stage motor 108 includes an output shaft 134". The output shaft 134" has a hollow center 138". The drive shaft 116" is connected to the sun gear 120" of the forward-stage gear 106" through the hollow center 138" of the output shaft 134" of the forward-stage motor 108. The forward-stage gear set 106" is connected to a drive shaft 116' of the motor set 400. The drive shaft 116' rotates on the axis AA'.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An electric drive system comprising:
   a motor output shaft rotating on a motor axis;
   a first electric motor comprising a first motor shaft rotating on the motor axis, a first rotor axially connected with the first motor shaft, a first armature located radially outward of the first rotor and receiving a first electric current and interacting electromagnetically with the first rotor to generate a first motor torque;
   an epicyclical gear comprising a sun gear, a ring gear, a plurality of planet gears interposed between and meshed with the sun gear and the ring gear, and a carrier of the planet gears mechanically connected to each of the planet gears, wherein the sun gear, the ring gear and the carrier all rotate on the motor axis, and the carrier is connected to the motor output shaft via a first flange;
   a second electric motor interposed between the first electric motor and the epicyclical gear, comprising a second motor shaft rotating on the motor axis, a second rotor axially connected with the second motor shaft, a second armature located radially outward of the second rotor and receiving a second electric current and interacting electromagnetically with the second rotor to generate a second motor torque, wherein the second motor shaft comprises a hollow center along the motor axis and the first motor shaft extends through the hollow center of the second motor shaft and is connected to the sun gear; and
   a second flange connecting the second motor shaft to the ring gear, wherein the first flange and the second flange are located at opposite sides of the epicyclical gear;
   wherein the first electric motor is characterized by a first torque rating and a first power rating, and the second electric motor is characterized by a second torque rating and a second power rating, further comprising:
   a motor control unit that is electrically connected to the first electric motor and the second electric motor and provides the first electric current to the first armature and the second electric current to the second armature, said motor control unit comprising:
   a system optimization unit that receives a system torque signal and a system speed signal, and generates a first torque command signal, a first speed command signal, a second torque command signal and a second speed command signal based on the system torque signal and the system speed signal, said system optimization unit comprising:
     a data memory module that stores a first motor efficiency data of the first electric motor and a second motor efficiency data of the second electric motor, and
     a computation module that determines the first torque command signal, the first speed command signal, the second torque command signal and the second command signal based on the first motor efficiency data, the second motor efficiency data, the system torque signal and the system speed signal;
   a first inverter that receives the first torque command signal and the first speed command signal, and determines the first electric current based on the first torque command signal and the first speed command signal, wherein the first inverter is electrically connected to the first electric motor; and
   a second inverter that receives the second torque command signal and the second speed command signal, and determines the second electric current based on the second torque command signal and the second speed command signal, wherein the second inverter is electrically connected to the second electric motor.

2. A method of operating the electric drive system of claim 1 comprising steps of:
   computing a system power demand based on the system torque signal and the system speed signal,
   comparing the system torque signal and the second torque rating of the second electric motor;
   generating the second electric current for the second electric motor based on the system torque signal and generating a zero first electric current for the first electric motor when the system torque signal is less than or equal to the second torque rating and the system power demand is less than or equal to the second power rating; and
   generating the first electric current for the first electric motor and generating the second electric current for the second electric motor when the system torque signal is greater than the second torque rating or the system power demand is greater than the second power rating, comprising:

determining a first initial torque command for the first electric motor based on the system torque signal and the second torque rating, determining a second initial torque command for the second electric motor based on the second torque rating, setting a first initial speed command for the first electric motor equal to the system speed signal, setting a second initial speed command for the second electric motor equal to the system speed signal, determining a first update torque command for the first electric motor, wherein the first update torque command is different than the first initial torque, determining a second update torque command for the second electric motor, wherein the second update torque command is different than the second initial torque, and wherein the sum of the first update torque command and the second torque update command equals to the system torque signal, determining a first update speed command (N1) for the first electric motor, wherein the first update speed command is different than the first initial speed command, and determining a second update speed command (N2) for the second electric motor, wherein the second update speed command is different than the second initial speed command, and wherein the first update speed command, the second update speed command and the system speed signal (N) are related with each other according to $N = Cg*N1 + (1-Cg)*N2$ wherein Cg is a constant predetermined by the epicyclical gear.

3. The method of operating an electric drive system as in claim 2 further comprising steps of:

determining a first motor efficiency at a first motor operating point specified by the first initial speed command for the first electric motor and the first initial torque command for the first electric motor;

determining a second motor efficiency at a second motor operating point specified by the second initial speed command for the second electric motor and the second initial torque command for the second electric motor;

determining a third motor efficiency at a third motor operating point specified by the first update speed command for the first electric motor and the first update torque command for the first electric motor;

determining a fourth motor efficiency at a fourth motor operating point specified by the second update speed command for the second electric motor and the second update torque command for the second electric motor;

computing a first combined efficiency based on the first motor efficiency, the second motor efficiency, the first initial speed command, the second initial speed command, the first initial torque command and the second initial torque command;

computing a second combined efficiency based on the third motor efficiency, the fourth motor efficiency, the first update speed command, the second update speed command, the first update torque command and the second update torque command;

comparing the second combined efficiency with the first combined efficiency;

generating the first torque command based on the first initial torque command and generating the second torque command based on the second initial torque command when the first combined efficiency is greater than or equal to the second combined efficiency;

generating the first torque command based on the first update torque command and generating the second torque command based on the second update torque command when the second combined efficiency is greater than the first combined efficiency; and generating the first electric current based on the first torque command and generating the second electric current based on the second torque command.

* * * * *